US007360232B2

(12) United States Patent
Mitchell

(10) Patent No.: US 7,360,232 B2
(45) Date of Patent: Apr. 15, 2008

(54) SYSTEM AND METHOD TO SUBSCRIBE TO CHANNEL URL ADDRESSES AND TO PROVIDE NON-PROGRAMMING-RELATED URL ADDRESSES IN AN INTERACTIVE VIDEO CASTING SYSTEM

(75) Inventor: Slade Mitchell, North Bend, WA (US)

(73) Assignee: Diego, Inc., Kirkland, WA (US)

( * ) Notice: Subject to any disclaimer, the term of this patent is extended or adjusted under 35 U.S.C. 154(b) by 1140 days.

(21) Appl. No.: 10/033,728

(22) Filed: Dec. 28, 2001

(65) Prior Publication Data

US 2002/0162121 A1    Oct. 31, 2002

Related U.S. Application Data

(63) Continuation-in-part of application No. 09/843,296, filed on Apr. 25, 2001.

(51) Int. Cl.
*H04N 7/173* (2006.01)
(52) U.S. Cl. .................. 725/112; 725/34; 725/110; 725/136; 348/460; 348/734
(58) Field of Classification Search ............ 348/461, 348/473, 487, 564, 731, 460, 734; 725/113–118, 725/111–112, 144–148, 109, 135, 34–35, 725/110, 133, 141, 136, 153
See application file for complete search history.

(56) References Cited

U.S. PATENT DOCUMENTS

| | | | |
|---|---|---|---|
| 5,485,221 A * | 1/1996 | Banker et al. ............... 348/563 |
| 5,774,664 A | 6/1998 | Hidary et al. .......... 395/200.48 |
| 5,929,849 A | 7/1999 | Kikinis ........................ 345/327 |
| 5,945,988 A * | 8/1999 | Williams et al. ............. 715/747 |
| 5,982,445 A | 11/1999 | Eyer et al. ................... 348/461 |
| 5,987,509 A | 11/1999 | Portuesi ....................... 709/217 |
| 6,018,768 A * | 1/2000 | Ullman et al. ............... 709/218 |
| 6,058,430 A | 5/2000 | Kaplan ........................ 709/245 |
| 6,097,441 A | 8/2000 | Allport ........................ 348/552 |
| 6,104,334 A | 8/2000 | Allport ........................ 341/175 |
| 6,130,726 A | 10/2000 | Darbee et al. ............... 348/734 |
| 6,181,326 B1 | 1/2001 | Takahashi .................... 345/158 |
| 7,051,357 B2 * | 5/2006 | Carr ............................ 725/110 |

* cited by examiner

*Primary Examiner*—Ngoc Vu
(74) *Attorney, Agent, or Firm*—Darby & Darby P.C.; Bruce E. Black

(57) ABSTRACT

A remote device is capable to receive network address information, such as uniform resource locator (URL) addresses, and other supplemental content that are available along with television signal. A set top box coupled to a television receives the network address information via triggers. The set top box transmits a television program from a first channel to a television, and transmits network address information associated with a second channel to the remote device. After receiving the network address information, the remote device can display the corresponding supplemental content while a viewer is watching the first channel on the television. The supplemental content can include program-related address information and/or non-programming-related content. In another technique, the viewer can subscribe certain channels, such that supplemental content on the subscribed channels is obtained and stored, and can be made available to the remote device via the set top box or via a different communication link.

36 Claims, 10 Drawing Sheets

SYSTEM AND METHOD TO SUBSCRIBE TO CHANNEL URL ADDRESSES AND TO PROVIDE NON-PROGRAMMING-RELATED URL ADDRESSES IN AN INTERACTIVE VIDEO CASTING SYSTEM

CROSS-REFERENCE TO RELATED APPLICATION

The present application is a continuation-in-part of U.S. patent application Ser. No. 09/843,296, entitled "APPARATUS AND METHOD TO PROVIDE SUPPLEMENTAL CONTENT FROM AN INTERACTIVE TELEVISION SYSTEM TO A REMOTE DEVICE," filed Apr. 25, 2001, assigned to the same assignee as the present application, and incorporated herein by reference in its entirety.

TECHNICAL FIELD

This disclosure relates generally to transmission and reception of information, and in particular but not exclusively, relates to the transmission and reception of program-related content and/or non-programming-related content available via interactive television.

BACKGROUND

Television and Internet technologies are beginning to converge. With the increasing use of interactive television, viewers can now access Internet content via use of their television. Indeed, with the convergence of these two types of technologies, viewers with widely varied interests can now have access to the virtually limitless amount of information available on the Internet while they are watching television programs.

Many interactive television systems utilize a set top box to receive television signals from a Multiple System Operator (MSO) and to provide the television signals to a television. As its name implies, a set top box is typically placed in close proximity to a television, and provides the viewer with control over the selection of television programs to view. Set top boxes that are compatible with the particular interactive television system can also operate to allow the viewer to access the Internet via their television. Thus, when a television program is transmitted to the set top box along with an Internet uniform resource locator (URL) address (typically via use of triggers), the set top box can display some sort of visual indicator to the viewer to allow the viewer to navigate to that URL address, and then displays content available from that URL address.

There are some drawbacks, however, with use of a set top box in this manner to "surf" the Internet while viewing the television program. For instance, the Internet content retrieved from the URL address is rendered on the same television screen as the television program. This can be very distracting to the viewer, particularly if the television program is completely obscured by the Internet content rendered on the television screen. Even if the television has "picture-in-picture" capability that allows multiple images to be displayed, the overall image from the television screen can still be very distracting. Furthermore, text or graphics of the Internet content, especially if rendered in a picture-in-picture arrangement, may be difficult to read by the viewer if the viewer is sitting some distance away from the television screen.

As an alternative to displaying Internet content on the television screen, the viewer may choose to access the URL address via a remote personal computer (PC) or laptop. However, this can often be clumsy and inconvenient to the viewer. In a typical case, the viewer has to "watch for" a URL address once it is displayed by the television program to indicate the availability of Internet content or other supplementary information/content, and then quickly write down the URL address on a piece of paper before the URL address disappears from the television screen. Next, the viewer has to launch a web browser at the PC or laptop, and then manually key in the URL address from the piece of paper. By the time that the web browser renders the Internet content from the URL address, additional URL addresses may have been displayed by the television program or the original URL address may no longer be relevant or of interest.

There is a somewhat analogous problem if the viewer is "channel surfing" television channels (as opposed to "surfing the Internet" via television) or otherwise tuning from one television channel to another. As its name implies, "channel surfing" typically involves sequentially tuning through a television channel lineup, until a program of interest is found. In instances of channel surfing, the viewer may encounter URL addresses and supplemental content in a particular television channel, but then tunes to another television channel to continue surfing. In this scenario, the viewer risks losing important URL addresses as the viewer flips back and forth between television channels, especially if the viewer has to manually write down URL addresses on a piece of paper or manually enter URL addresses on a PC/laptop (or other remote device).

As a further illustration of this dilemma, assume that a URL address is being processed by the remote device while the viewer is watching a television program that provided that URL address. This process and/or the initial retrieval of the URL address can be disrupted when the viewer changes to a different television channel in order to watch a different television program. If the viewer wishes to re-access the previous URL address, the viewer would have to tune back to the original channel to obtain that URL address, if that URL address is even still available. In some instances, the URL address may no longer be available from the original television channel when the viewer tunes back to that channel, and thus the viewer would be in an unfortunate situation if the URL address was not previously saved on paper.

Another problem with channel surfing or other viewing of television programs is that the viewer is not made aware of non-programming-related content (such as weather alerts, stock indexes, scores of sport games, or other information that is not necessarily directly related to the particular program that is currently being viewed), until the viewer comes across a television channel that provides the non-programming-related content. In other instances, there may be programming-related or non-programming-related content in a particular channel that the viewer could miss, simply because the viewer is not watching that channel when the content is made available.

Therefore, improvements are needed in the providing of supplemental content for interactive television.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Figure 1:
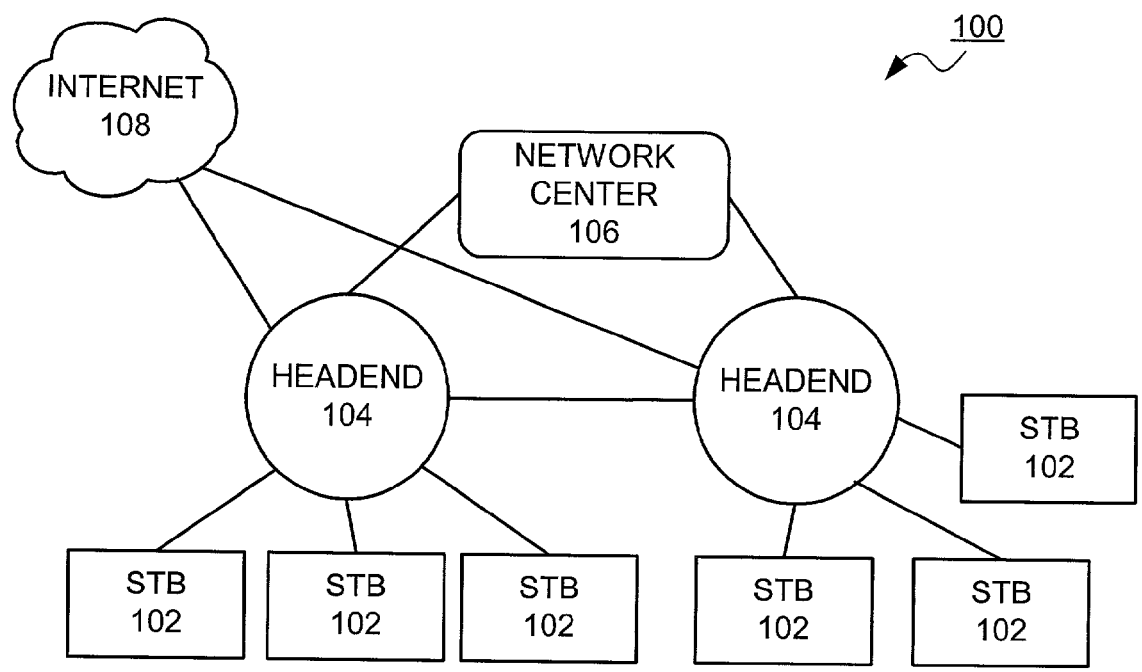
FIG. 1 is a diagram of an interactive television system according to an embodiment of the invention.

Embodiments of an apparatus and method to provide supplemental content from an interactive television system to a remote device and/or to a television (or other client terminal) are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, when address information (such as URL addresses or other network addresses) is provided along with television programming (such as via triggers), an embodiment of the invention integrates the supplemental content (e.g., Internet content) associated with the address information with the television program viewing experience. In an embodiment, a remote device is capable to receive the address information as the information is transmitted to the remote device from a set top box (or other client terminal) coupled to a television. After receiving the address information, a browser, such as a web browser, of the remote device can navigate to the URL address or other address specified by the address information. In this manner, a user of the remote device can be presented with supplemental content associated with the address information that was made available through a television program that the user is watching, alternatively or in addition to having the supplemental content presented on a display screen of the television.

In a refinement to this scenario, the viewer can tune to a different television channel without necessarily losing the address information that was available from the previously tuned to channel, thereby allowing the viewer to have access to the original address information for later viewing. In an embodiment, the viewer can be provided with access to the address information (and corresponding supplemental content), without necessarily having to tune the television to the particular channel where the address information is available. Thus, the viewer can view programming from a different television channel, without necessarily losing supplemental content from a particular television channel. In an embodiment, a subscription technique may be used to perform this.

Therefore, in one embodiment, the user can be presented with supplemental content related to a television program that the user is not currently watching. Alternatively or in addition in an embodiment, non-programming-related information, such as weather alerts, emergency announcements, stock indexes, scores of sport games, and other information that is not necessarily directly related to the program that is currently being watched, can be presented to the viewer.

Referring now to FIG. 1, there is shown an interactive video casting system, such as an interactive television system 100, including a cable television (CATV) network, according to an embodiment of the invention. In one implementation, the system 100 includes a plurality of set top boxes 102 or other customer premises equipment (CPE) or client terminals located, for instance, at customer homes.

A set top box 102 (hereinafter "STB 102") comprises a consumer electronics device that serves as a gateway between a customer's television and a broadband communication network, such as a cable network. As its name implies, an STB 102 is typically located on top of, or in close proximity to, the customer's television, although it is to be appreciated that some televisions may have integrated therein set top box circuitry and operational features. In general, an embodiment of the STB 102 operates in conjunction with data streams encoded using the Moving Pictures Experts Group (MPEG) standard, although it is to be appreciated that other standards may be used as well. STBs 102 are also capable of two-way data streams, allowing consumers to access services such as electronic shopping and video-on-demand or other two-way communication with a remote communication system.

In one embodiment, an STB 102 receives encoded television signals from the system 100 and decodes the same for display on the television. Additionally, an STB 102 receives commands from a user (via a remote control in one embodiment) and transmits such commands back to the system 100.

In various embodiments, each STB 102 is connected to a headend 104. In the context of a cable network, a broadcast center such as a headend 104 is a centrally located facility where CATV transmissions are received from a local CATV satellite downlink and packaged together for transmission to customer homes.

Headends 104 may be coupled directly to one another or through a network center 106. In some cases, headends 104 may be connected via a separate network, one particular example of which is an Internet 108. In one embodiment, a plurality of servers can be included in or otherwise coupled to headends 104 or the Internet 108 (see, e.g., FIGS. 5-6). Of course, the illustrated network topology is provided for example purposes only, and other networks and network configurations may be used within the scope of the invention.

In one embodiment of the invention, supplemental content (such as Internet content, streaming media, GIF files, JPEGs, audio files, or other information or resources available from the Internet 108) can be made accessible or available along with the television program signal via use of triggering techniques. A suitable type of triggering technique that can be used by an embodiment of the invention is based on the Advanced Television Enhancement Forum (ATVEF) triggers.

With ATVEF's Transport Type A implementation, trigger information is inserted in the vertical blanking interval (VBI) of the television program signal. The trigger information (or "triggers") includes URL addresses, Internet Protocol (IP) addresses, file transfer protocol (FTP) locations, local or remote cache locations, or other address information of the Internet 108 (or other address locations) where supplemental content associated with the television program can be obtained. For the sake of simplicity of explanation, URL addresses will be used herein when describing embodiments of the invention, and it is understood that other types of addresses may also be processed.

If the viewer desires to view such supplemental content, the corresponding URL address can be accessed by a web browser to retrieve the supplemental content for rendering. Transport Type A implementations have an advantage in that the triggers can be synchronized with a particular subject-matter segment of the television program by being inserted into the appropriate VBI locations.

With ATVEF's Transport Type B implementations, a trigger steam is sent separately from the audiovisual stream (e.g., the television program signal). There may also be separate resources and announcement streams. Other triggering mechanisms that can be used by embodiments of the invention include the Wink™ and WorldGate™ triggering mechanisms. It is to be appreciated that embodiments of the invention can operate based on any of these triggering techniques, their variations or combinations, or other suitable triggering techniques that make addresses of supplemental content available.

Figure 2:
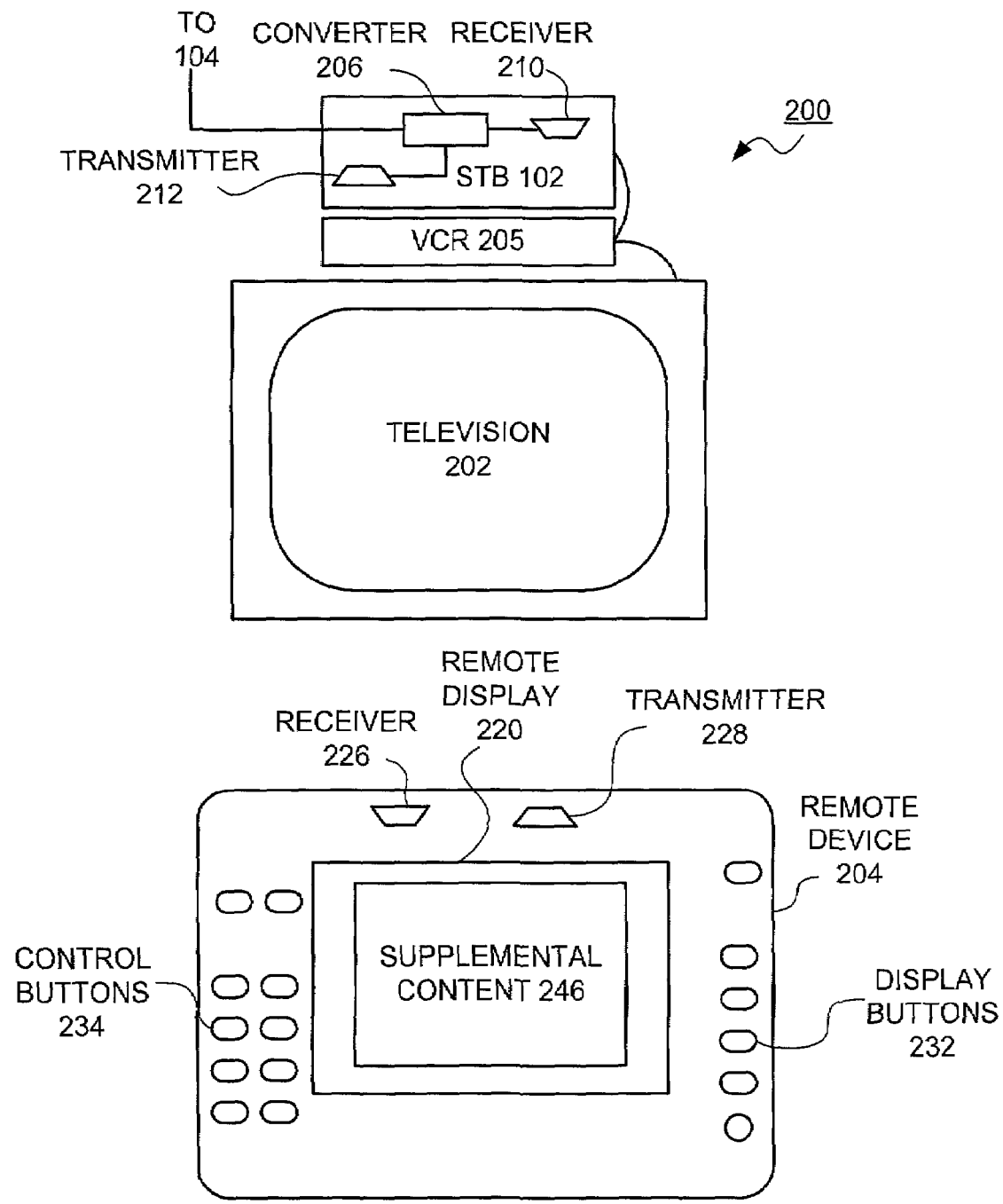
FIG. 2 is a schematic block showing a client-side portion of the interactive television system of FIG. 1 according to an embodiment of the invention.

Referring now to FIG. 2, there is shown a schematic block diagram of a client-side portion 200 of the interactive television system of FIG. 1 according to an embodiment of the invention. The portion 200 includes, in one implementation, a television 202, an STB 102, and a remote device 204. In various embodiments, the portion 200 may also include a videocassette recorder (VCR) 205 or other recording device.

The television 202 may be configured to display television signals in a variety of formats, including standard analog or digital television formats or high-definition television (HDTV) formats. As illustrated, the television 202 can be coupled to the STB 102 in order to receive and display television signals received from the system 100, and more specifically, from a headend 104.

Figure 3:
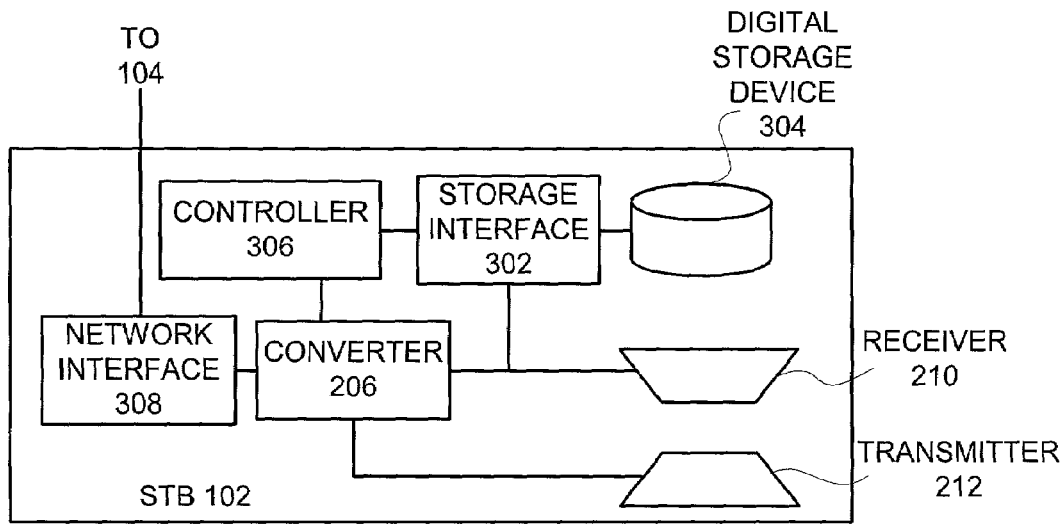
FIG. 3 is a schematic block diagram of a set top box according to an embodiment of the invention.

In one embodiment, the STB 102 includes a converter 206 for converting digitally encoded (e.g., MPEG) television signals from the system 100 into signals of a form suitable for use by the television 202, and also includes a network interface 308 (see, e.g., FIG. 3). In an embodiment, the network interface 308 can comprise one or more tuners. For instance, a first tuner can be used to tune to television broadcast signals that may be accompanied by triggers. A second tuner can comprise a cable modem tuner that can tune to a URL address to obtain supplemental content associated with the triggers received via the first tuner. This second tuner of the network interface 308 can be used, therefore, for Internet access via Data Over Cable System Interface (DOCSIS) or via Digital Audio-Visual Council (DAVIC) communication link(s).

In the illustrated embodiment, the STB 102 is equipped with a receiver 210, such as an infrared (IR) or radio frequency (RF) receiver or other suitable wireless receiver. The receiver 210 can receive control signals from the remote device 204 for operating the STB 102 and the television 202. The receiver 210 may also receive other types of data, such as information requests (e.g., requests for supplemental content sent from the remote device 204), e-mail, and the like, for transmission to the system 100.

In one implementation, the STB 102 also includes a transmitter 212, such as an IR or RF transmitter or other wireless transmitter. The transmitter 212 is configured, in one embodiment, to broadcast various types of information to the remote device 204, such as trigger information including URL addresses, Internet content, hypertext markup language (HTML) files, e-mail, other supplemental content, and the like.

An embodiment of the remote device 204 includes a remote display 220 for displaying supplemental content 246, such as web page content available by accessing program-related network address information or non-programming-related network address information (e.g., URL addresses), as described in greater detail below.

In the illustrated embodiment, the remote device 204 includes a receiver 226, such as an RF or IR receiver, for receiving signals sent by the transmitter 212 of the STB 102 and/or by a network, such as wirelessly via the Internet 108. Some of these signals may include the trigger information retrieved by the STB 102 from the system 100 and/or signals from the Internet 108 that include URL addresses. Additionally, the remote device 204 may include a transmitter 228, such as an RF, IR, or other transmitter that transmits control signals and other data to the receiver 210 of the STB 102, as well as to the television 202 (e.g., to adjust the television's 202 volume).

In one embodiment, the transmitters 212, 228 modulate signals with a carrier frequency to enable transmission of information, such as URL addresses, between the STB 102 and the remote device 204. For example, the transmitters 212, 228 may operate according to the IEEE 802.11a or 802.11b Wireless Networking standards. Alternatively, the transmitters 212, 228 may utilize DECT or "Bluetooth" or other standard or proprietary protocols. In an embodiment, the transmitters 212, 228 may be configured to transmit other frequencies of the electromagnetic spectrum, such as UHF, VHF, microwave, or the like.

To perform modulation and transmission, the transmitters 212, 228 may include various additional components not specifically illustrated. For example, the transmitters 212, 228 may include source encoders to reduce the amount of bandwidth required, channel encoders to modulate the transmitted information with a carrier wave, and transmission antennas to broadcast the information. The receivers 210, 226 may also include components not specifically illustrated but well known in the art.

Display buttons 232 may be provided and conveniently located on the remote device 204 to control various aspects of the remote display device 220. The display buttons 232 may include buttons to vertically or horizontally scroll material on the remote display 220, to adjust the brightness, contrast, and coloration of the remote display 220, or to place the remote display device 220 in an "on," "off," or "standby" setting. For instance, one of the display buttons 232 may be used to set the remote device 204 in a "receive" mode to receive URL addresses transmitted from the STB 102 and/or from a network, such as from the Internet 108 via servers. Another one or more of the display buttons 232 may be used for web browsing activities, such as clicking on hypertext links, launching web browsers, selecting URL addresses from a list or menu, sorting favorite URL addresses, navigating to a web site, entering URL addresses (for example if the display buttons 232 comprise part of an alphanumeric keyboard), or other activities associated with accessing and viewing supplemental content. The remote device 204 may also include a Sony "Vaio"®-style mechanical wheel to select items from a menu.

Additionally, control buttons 234 may also be provided on the remote device 204 to control the operation of the STB 102 and/or the television 202. The control buttons 234 may include buttons for channel selection, volume adjustment, power on/off, brightness, contrast, and coloration, and the like. The control buttons 234 may also be configured to control other devices, such as the VCR 205, a digital video disk (DVD) player, a compact disc (CD) player, a tuner, an amplifier, or a receiver. One of the control buttons 234 may also be used to set the remote device 204 to the receive mode. Some of the buttons on the remote device 204 may be implemented as "soft buttons."

In one embodiment, a viewer can select a URL address to navigate to by touching a corresponding indication displayed on the remote display 220. In one embodiment, while the viewer is watching a first channel on the television 202, the remote display 220 can render supplemental content from URL addresses available via triggers present in a second channel, without having to tune to the second channel. This process will be described later below.

The remote device 204 need not be limited to reception of URL addresses, but may also be used for more varied, higher-bandwidth applications. For example, the STB 102 may be configured to send, to the remote device 204, background information for television programs, such as pictures of actors and actresses, video previews, and audio/video interviews with people associated with the program. In one embodiment, the remote device 204 may receive URL addresses and supplemental content itself (as well as higher-bandwidth applications) from a network (e.g., from servers and/or the Internet 108), alternatively or in addition to receiving such information from the STB 102.

In such an embodiments, the transmitters 212, 228 and receivers 210, 226 may be configured for high-bandwidth transmission and reception, which may use, for example, frequency division multiplexing (FDM) or other techniques. Transmission of video and audio between the STB 102 and the remote device 204 may operate according to various standard protocols, such as MPEG and video over IP.

As shown in FIG. 3, the STB 102 may include a number of additional components beyond those depicted in FIG. 2. For example, the STB 102 may include a storage interface 302, which provides an interface with a digital storage device 304, such as a hard disk drive or other memory device. In one embodiment, the storage interface 302 receives triggers including network address information and/or supplemental content, from the converter 206 and delivers the same to the digital storage device 304 for storage thereof. When a user desires to review the stored information in the digital storage device 304, the information may be transmitted by the transmitter 212 of the STB 102 to the receiver 226 of the remote device 204 for display on the remote display 220. It is to be appreciated, however, that in another embodiment, information may be directly transmitted to the remote device 204 by the STB 102 without being previously stored in the digital storage device 304.

In one embodiment, the STB 102 further includes a controller 306 that is in communication with the storage interface 302 and the converter 206. The controller 306 may be embodied as a microcontroller, microprocessor, digital signal processor (DSP) or other suitable device. The controller 306 may manage the operation of the STB 102, including, for example, reception of trigger information from the system 100, transmission of the trigger information to the remote device 204, the storage and retrieval of supplemental content, and the like. As noted above, the controller 306 may perform these and other operations based upon control signals generated by the remote device 204 and transmitted to the receiver 210.

In one embodiment, the STB 102 includes the separate network interface 308 for providing access to the system 100. The type of network interface 308 can vary depending on the underlying system 100. In a cable network, for instance, the network interface 308 may comprise a cable modem or the like. In alternative embodiments, the functionality of the network interface 308 may be provided by the converter 206, including one or more tuners to tune to television signals accompanied by triggers.

Figure 4:
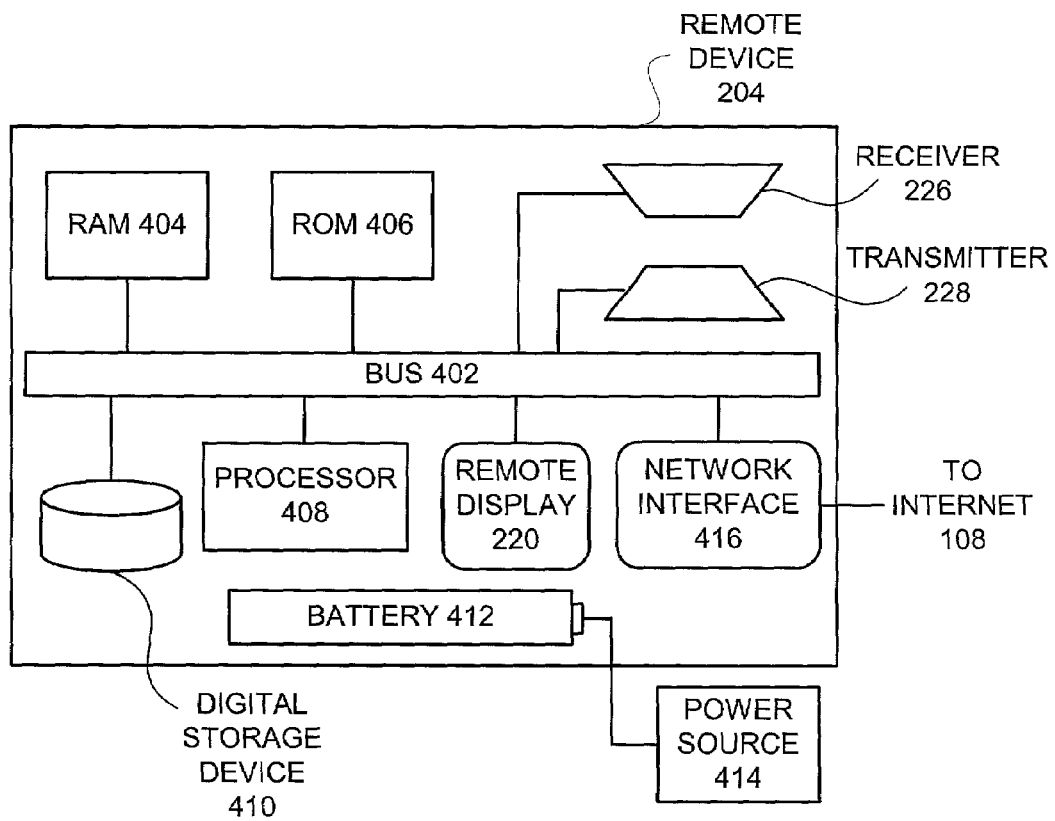
FIG. 4 is a schematic block diagram of a remote device according to an embodiment of the invention.

FIG. 4 provides a more detailed schematic representation of an embodiment of the remote device 204, including the receiver 226, transmitter 228, and the remote display 220. As shown in FIG. 4, additional components may be included. For example, the remote device 204 may include a bus 402 to enable data transfers between the various components of the remote device 204, and a battery 412.

The bus 402 may be electrically connected to random access memory (RAM) 404, configured to store data for temporary use, such as URL addresses and supplemental content retrieved from the URL addresses. Similarly, a read-only memory (ROM) 406 may be provided to store more permanent data, such as fixed code and configuration data. In one embodiment, the ROM 406 may be configured to store an operating system for the remote device 204.

The remote device 204 may also include a processor 408 for performing high-level processing functions, such as preparing and formatting URL addresses and supplemental content for display on the remote display 220. The processor 408 may also sense a user's operation of the control buttons 234 or the "virtual" buttons displayed on the remote display 220, and generate appropriate command signals for transmission to the STB 102 and/or television 202. Additionally, the remote device 204 may include a machine-readable storage medium, such as a digital storage device 410 for storage of network address information, supplemental content, video/audio information, and the like. The digital storage device 410 may also store an operating system for the remote device 204. The operating system may be configured to use the Wireless Application Protocol (WAP) to access information remotely from the STB 102 and/or the network 100, in one embodiment. The digital storage device 410 can also store a web browser to retrieve supplemental content from the Internet 108 (or from some other location), such as supplemental content triggered from any particular channel, and to render the supplemental content on the remote display 220. The digital storage device 410, the RAM 404, or other machine-readable storage medium of the remote device 204 may be used to cache or load supplemental content.

In one embodiment, the remote device 204 can be provided with access to the Internet 108 or to another location where supplemental content can be obtained, based on the URL address information received from the STB 102 or from a network location, as will be described later below. In the embodiment of the remote device 204 shown in FIG. 4, the remote device 204 can be provided with a network interface 416 (which can include a dial-up modem) that communicatively couples the remote device 204 to the Internet 108. Such a communicative coupling may be a hardwired connection (e.g., xDSL, ISDN, twisted pair, and the like) or a wireless connection to the Internet 108, using suitable communication techniques. Thus in this embodiment, the remote device 204 can have a connection to the Internet 108 that is distinct/separate from the STB's 102 cable modem connection to the Internet 108. Those skilled in the art will recognize that the various components of the remote device 204 may be embodied in a number of different configurations for ergonomics and ease-of-use.

In another embodiment, the remote device 204 may connect to the Internet 108 via the cable modem in the network interface 308 of the STB 102. Thus in this embodiment, the connection to the Internet by the remote device 204 is "tied to" the STB 102, with Internet information (e.g., URL addresses and supplemental content) being exchanged between the STB 102 and the remote device 204 via the transmitters 212, 228 and the receivers 210, 226.

Figure 5:
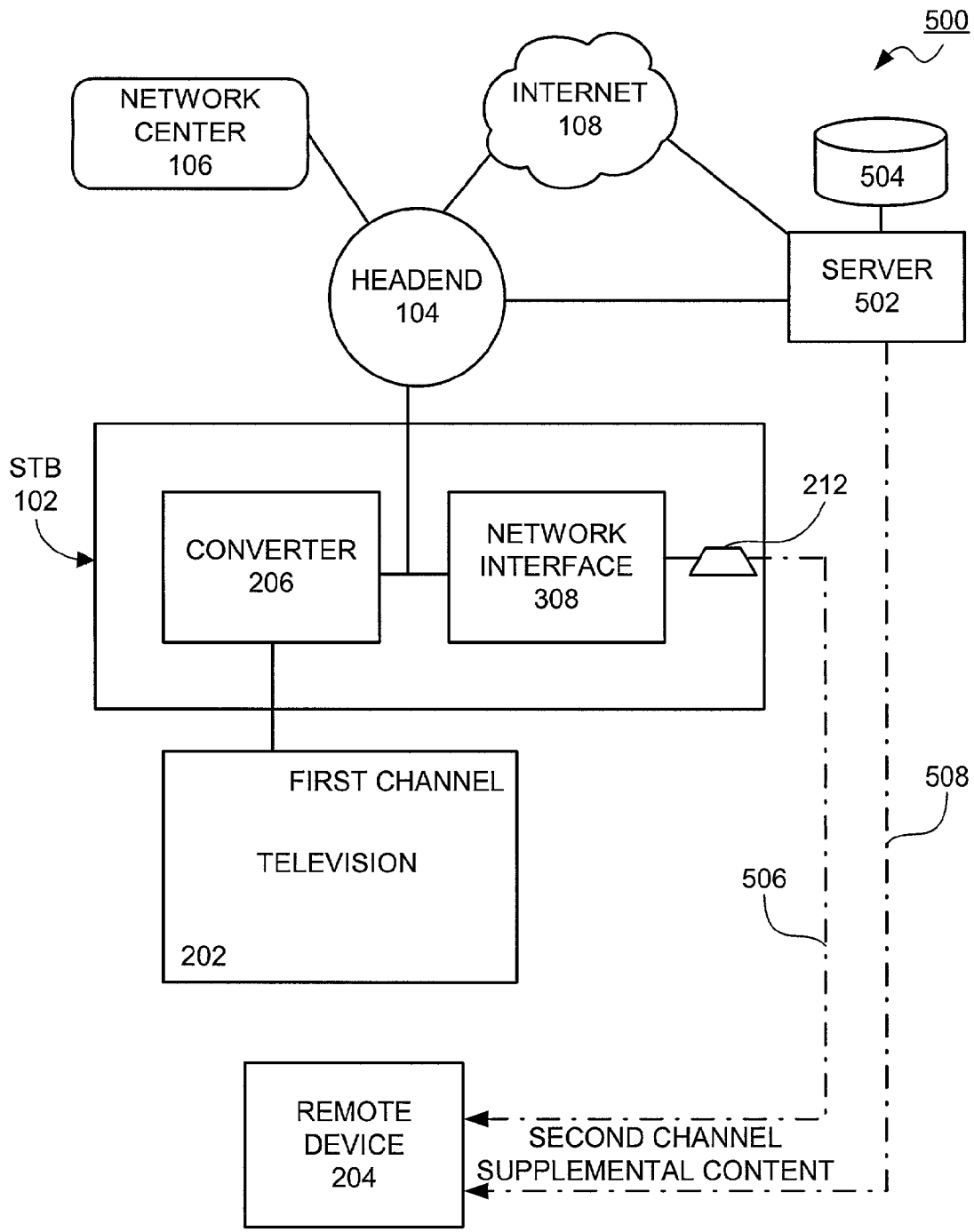
FIG. 5 is a schematic block diagram of a system for subscribing to programming-related URL addresses according to an embodiment of the invention.

Referring to FIG. 5, there is shown a schematic block of a system 500 for subscribing to programming-related URL addresses according to an embodiment of the invention. The system 500 can comprise parts of the system 100 of FIG. 1 and of the client-side portion 200 of FIG. 2 in one implementation. In the system 500, the viewer has "subscribed" to channels and/or programs of interest. In an embodiment, this subscription involves specifying or registering to store content from one or more television channels and/or television programs shown therein. Such content, which can include triggers and their respective URL addresses and other supplemental content, may be stored in a storage unit 504 (or in the storage devices 304 and/or 410 at the client side). The storage unit 504 may be coupled to a server 502 or otherwise coupled so that its stored content can be provided to the remote device 204. The server 502 can be located in or otherwise coupled to a headend 104 and/or the Internet 108.

Various techniques can be used to subscribe to channels. In one example, the viewer may provide instructions to the MSO to extract and store all triggers from television programs that are shown (or to be shown) on a particular channel. Another technique is to instruct the MSO to extract and store triggers from only particular shows, during specific periods of time, or other specific viewer preferences. In yet another embodiment, subscription may be performed more dynamically, where for instance, the viewer is watching a particular channel and decides that he wishes to subscribe to receive future supplemental content associated with television programs from that channel. The viewer can send a "subscribe" command to the headend 104, via the remote device 204 or other user input device, to instruct hardware and software at the headend 104 to extract or otherwise obtain trigger information and store that information in the storage unit 504. The viewer may then tune to another channel and need not worry about losing trigger information from the initial channel.

The MSO can maintain a database or other data store of these viewer preferences in the storage unit 504 or other storage location, such that the viewer preferences can be accessed as necessary to determine when to obtain triggers, and which triggers to obtain, for which viewer. In an embodiment, such triggers may be obtained/extracted at the headend 104, where suitable hardware and software can have access to all incoming television feeds that are accompanied by triggers.

In one embodiment, client-side systems may also be used for keeping track of which channels the viewer is interested in. That is, the STB 102 and/or the remote device 204 may be used to subscribe to one or more channels, rather than or in addition to MSO-managed subscription. The client-side system would then be responsible for getting the trigger information for the subscribed channels. According to various embodiments, the mechanisms employed by the client-side system could include periodic polling of the headend 104 and/or the server 502, a multi-cast model where trigger information from subscribed channels are sent to the remote device 204, a technique where the trigger information for the entire channel lineup might be "carousel" broadcast, or other suitable technique.

In an embodiment, the trigger information (e.g., URL addresses and other supplemental content) may be accessed from the storage unit 504 by the viewer while viewing a television program unrelated to the stored trigger information, or any convenient time after the trigger information is originally presented in television programs. This feature allows the viewer to view a first television program on a first television channel, without losing the ability to access URL addresses that may be present (via triggers) in a second television program on a second television channel. By saving the URL addresses in the storage unit 504, the viewer can "channel surf" without necessarily missing URL addresses from certain channels, and can access the URL addresses at the viewer's leisure at a later time, such as via use of the remote device 204.

In one embodiment, the remote device 204 can receive the second channel supplemental content from the Internet 108 through the server 502, by communicating via a link 508, such as a telephone line or wireless communication link. Thus in this scenario illustrated in FIG. 5, the viewer can view a television program on a first channel on the television 202, while supplemental content from a second television channel (e.g., a subscribed channel) is made available by the server 502 to the remote device 204 via the link 508, thereby allowing for concurrent or subsequent viewing of that supplemental content.

In another embodiment shown in FIG. 5, the converter 206 in conjunction with the television broadcast tuner of the STB 102 is tuned to the first channel, thereby allowing display of a television program from that channel in the television 202. Meanwhile, the network interface 308 (such as a cable modem tuner) is tuned to receive stored URL addresses (and other supplemental content associated with a second channel) from the server 502 by way of the headend 104, if or when the remote device 204 requests this second channel supplemental content. The remote device 204 then receives these addresses by way of a wireless link 506 from the transmitter 212 coupled to the network interface 308, while the television 202 is displaying the television program from the first channel.

Additionally, it is possible to send first channel supplemental content to the remote device 204 as well as second channel supplemental content, using suitable multiplexing techniques or other techniques that allow the transmitter 212 to concurrently communicate supplemental content, as requested by the viewer, from both the first and second channels to the remote device 204. This would be the situation, for instance, if the viewer is channel surfing and then wishes to view supplemental content (on the remote device 204) from a television channel that is currently being shown on the television 202, while still wishing to view (concurrently or alternatively) supplemental content from a non-tuned (but subscribed) television channel.

Figure 6:
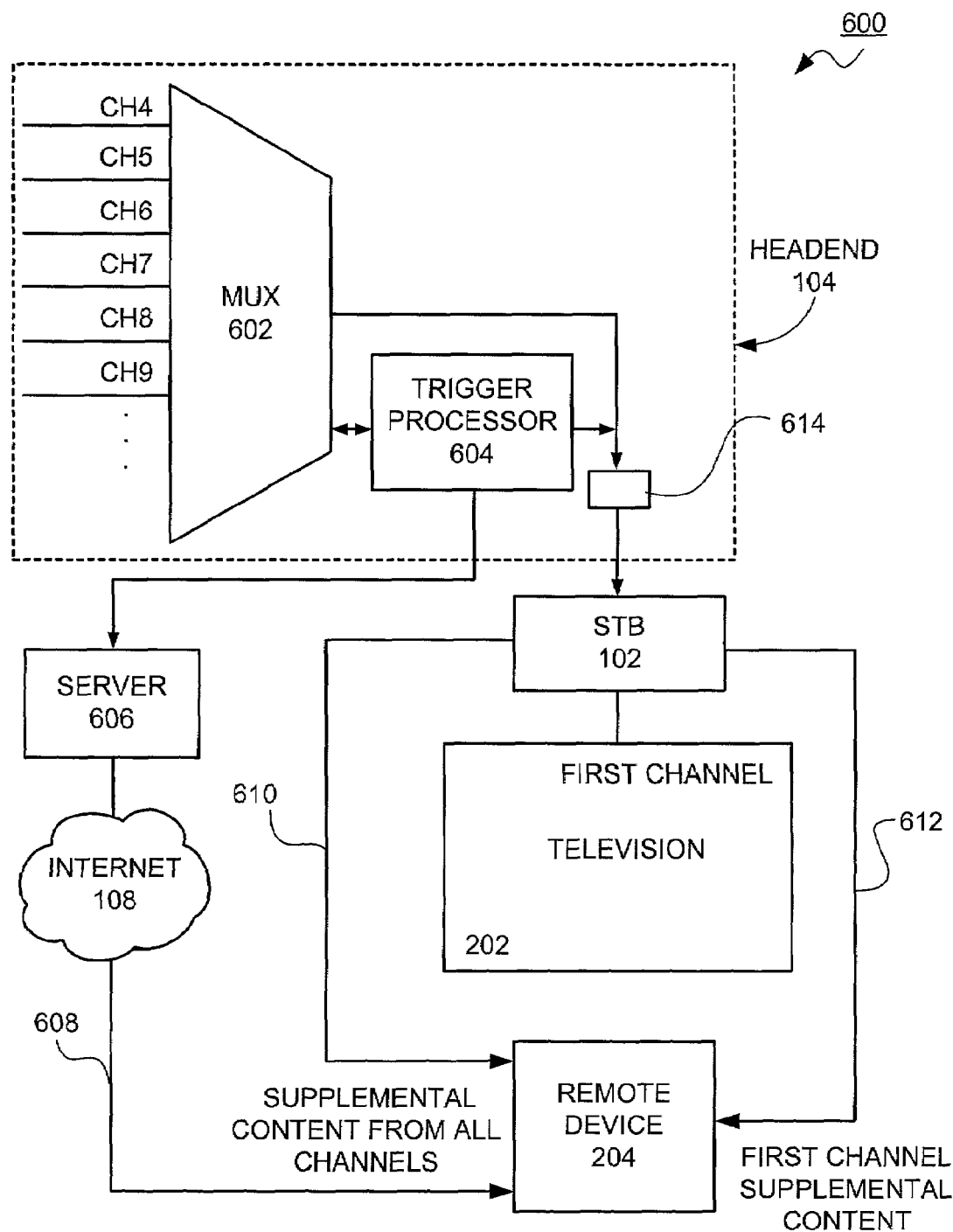
FIG. 6 is a schematic block diagram of a system for subscribing to programming-related URL addresses according to another embodiment of the invention.

Referring to FIG. 6, there is shown one possible embodiment of a system 600 for subscribing to or otherwise providing programming-related URL addresses to the remote device 204. Components of the system 600 may be embodied at least in part by the system 500, the system 100, or the client-side portion 200. As shown in FIG. 6, the headend 104 includes a multiplexer 602 and a trigger processor 604. The multiplexer 602, in one embodiment, multiplexes the television signals received from local broadcasters, satellite broadcasts, national broadcasters, and other content providers in a manner that these television signals can be provided in television channels to one or more STBs 102. As previously described herein, triggers can accompany these television signals.

The multiplexer 602 is coupled to the trigger processor 604, which extracts, records, copies, or otherwise obtains triggers (e.g., URL addresses) from the multiplexed television signals. In an embodiment, the trigger processor 604 detects, extracts, and processes all triggers present in all television channels, thereby potentially providing the viewer with a complete library of available supplemental content. As an example, the trigger processor 604 can detect triggers in the television signal(s) that correspond to URL addresses and supplemental content, while ignoring triggers that may perform control functions, synchronization functions, or other functions that are not necessarily needed by or applicable to the remote device 204. An example embodiment of the trigger processor 604 that detects, extracts, and processes triggers is a bank of STBs collocated in the headend 104, with each STB tuned to a specific (and different) channel.

Once the triggers are extracted from all of the television signals by the trigger processor 604, the corresponding URL addresses and other supplemental content may be provided to the remote device 204 in a number of ways. One possible path shown in FIG. 6 is to store the extracted information to a server 606. In one embodiment, while a television program on the first channel is tuned to by the STB 102, supplemental content from all channels is sent from the server 606 to the remote device 204, by way of the Internet 108 and a link 608. The received supplemental content is then stored in the digital storage device 410 in the remote device 204, where it may be selected and accessed for viewing by the viewer on the remote display 220.

In addition or alternative to the Internet path to deliver supplemental content to the remote device 204, the STB 102 can also perform to deliver the supplemental content from all channels to the remote device 204. This may be done in one embodiment by initially having the trigger processor 604 provide the extracted information to STBs 102 by way of a DOCSIS or DAVIC path (e.g., on the same coaxial cable as the television signals). In one such embodiment, the server 606 may be present in the headend 104 (such as at 614) to receive the trigger information obtained by the trigger processor 604, such that the trigger information need not necessarily travel through the Internet 108 to get to the remote device 204—the trigger information can travel, from 614, through the coaxial cable network downstream of the headend 104. An STB 102 may then tune its cable modem tuner (in the network interface 308) to receive the supplemental content, and then use its transmitter 212 to send the supplemental content to the remote device 204 via a link 610.

As with the example depicted in FIG. 5, the viewer may also concurrently or alternately receive, at the remote device 204, both supplemental content from all channels and supplemental content associated with the first channel that is currently tuned to. The supplemental content from these different sources may be provided via the link 610 or via another link 612.

It is to be appreciated that although the system 600 is described herein as providing supplemental content from all channels, this need not necessarily be the case in other embodiments. For instance, a subscription technique (similar to that of the system 500 of FIG. 5) can be applied to the system 600 such that triggers from only subscribed channels are detected, extracted, and processed for eventual communication to the remote device 204.

Figure 7:
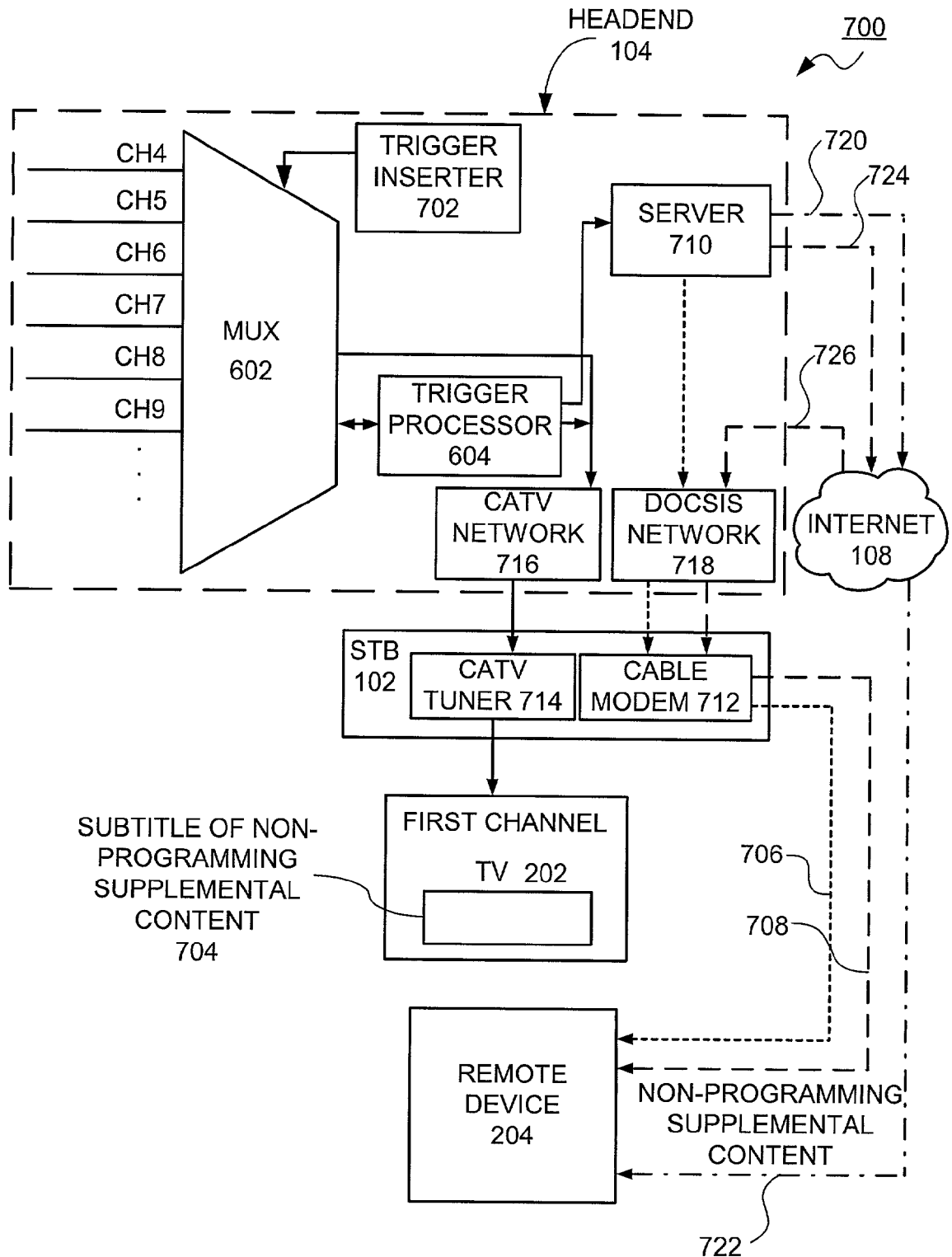
FIG. 7 a schematic block diagram of a system for providing non-programming-related URL addresses according to an embodiment of the invention.

Referring to FIG. 7, there is shown a block diagram of a system 700 for providing non-programming related URL addresses in accordance with an embodiment of the invention. Components of the system 700 may be embodied at least in part by the system 500 or 600, the system 100, or the client-side portion 200. As with the systems shown in FIGS. 5 and 6, the system 700 of FIG. 7 allows supplemental content to be provided to the remote device 204 independently of a particular channel that the television 202 may be showing. It is to be appreciated that although the system 700 is described herein in the context of providing non-programming-related URL addresses, the system 700 may also be used to provide programming-related URL addresses in other embodiments.

In one embodiment at the headend 104, a trigger inserter 702 coupled to the multiplexer 602 inserts triggers into each channel (e.g., overloads each channel). The trigger inserter 702 may insert triggers into the channels prior to their input into the multiplexer 602, during the course of multiplexing, or at the output of the multiplexer 602. These triggers can include URL addresses and other supplemental content, such as a weather alert, an emergency announcement, stock indexes, scores of sport games, and the like that are not necessarily related to the particular program being shown on the channel. As an example, by having the trigger inserter 702 insert a trigger announcing a "flood warning" into each channel, the flood warning may be presented during a baseball game (e.g., the weather-related flood warning is unrelated to the baseball game). Moreover, the same flood warning can appear in each channel at substantially the same time, such that the viewer will not miss the flood warning regardless of the particular channel that he is watching and regardless of any channel surfing activity that is being performed. As other examples, among the types of non-programming related supplemental content might include: headend-wide notification triggers (e.g., not targeted to a particular viewer/client—breaking news, stock tickers, etc.), or "subscribed supplementary triggers" (e.g., the triggers are targeted at a particular viewer).

To perform this in an embodiment, the multiplexed television signals, each having a trigger inserted by the trigger inserter 702, are sent to the STB 102 for eventual display on the television 202. In one embodiment, the URL address associated with the trigger from the currently tuned to channel is then transmitted to the remote device 204 by the transmitter 212 in the STB 102, via a wireless link 706, so that the viewer can view the supplemental content on the remote display 220 independently of a television program that the viewer is watching on the television 202. This may be performed in one embodiment by having a broadcast television tuner (e.g., a CATV tuner 714) continue to tune to receive the television signal from the current television channel from a CATV network 716, while a cable modem tuner 712 of the STB 102 tunes to receive the supplemental content (such as from a DOCSIS network 718, which may in turn be receiving the supplemental content from a server 710, the trigger processor 604, and/or from the multiplexer 602), which is then transmitted wirelessly via the link 706 to the remote device 204. Alternatively or in addition, the non-programming-related supplemental content may appear in the television screen by way of text (e.g., a subtitle 704, ticker, or graphical indicia corresponding to the non-programming-related information).

In another embodiment, the non-programming-related supplemental content may be provided to the remote device 204 via a different communication path. For instance, the headend 104 (by way of the server 710 at the headend 104, at a third-party system, or otherwise communicatively coupled to the headend 104) can provide the supplemental content to the remote device 204 via the Internet 108 and communication links 720 and 722. Thus, if the remote device 204 has Internet access capability different from the cable modem tuner 712 through the STB 102, it can receive the supplemental content via the links 720 and 722.

Another possible communication path to the remote device 204 is from the server 710 to the Internet 108 (via a link 724), back to the DOCSIS network 718 (via a link 726), and then to the cable modem tuner 712 in the STB 102. From the STB 102, the supplemental content can be transmitted to the remote device 204 via a link 708.

Whether received via the link 706, 722, or 708, one embodiment allows the viewer to specify which types of non-programming-related content to be provided. For example, filtering software can be present in the headend 104, the remote device 204, and/or the STB 102 such that the viewer can request that only sports scores be presented via non-programming-related triggers.

Figure 8A:
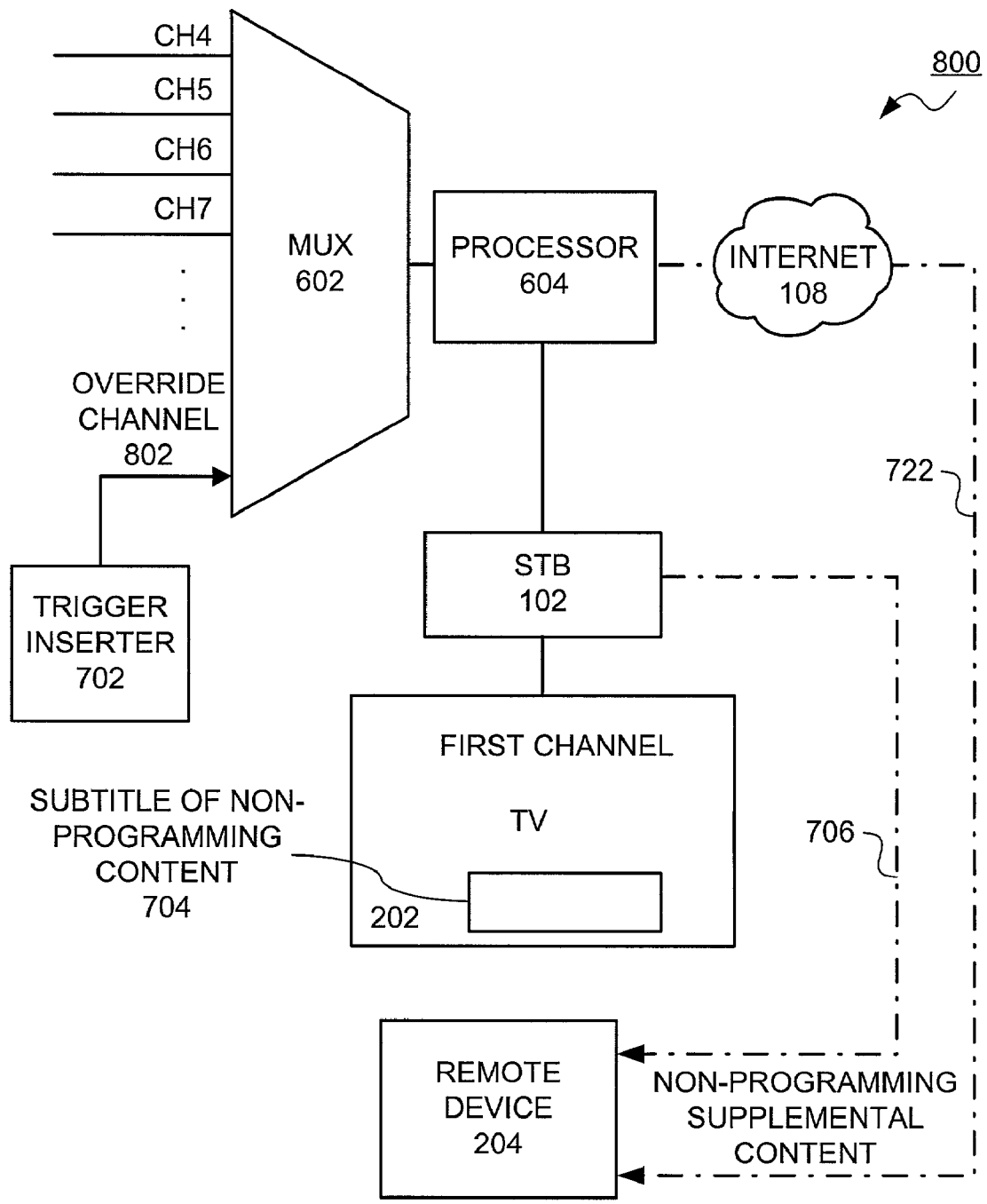
FIGS. 8A-8C are schematic block diagrams of systems for providing non-programming-related URL addresses according to various embodiments of the invention.

Referring to FIG. 8A, there is shown a block diagram of a system 800 for providing non-programming-related URL addresses according to another embodiment. Components of the system 800 may be embodied at least in part by the systems 500-700, the system 100, or the client-side portion 200. In the illustrated embodiment, the multiplexer 602 has a dedicated input for an "override channel" 802, which can carry non-programming-related supplemental content, including triggers. The trigger inserter 702 may be coupled to the dedicated input to provide non-programming-related triggers on the override channel.

In an embodiment, the STB 102 may include a tuner to "listen" to the override channel 802 for any activity, such as the presence of triggers, and then tune to the override channel 802 if triggers are present therein. Once tuned to the override channel 802 and receiving the triggers in that channel, the STB 102 may present the corresponding non-programming-related content on the television 202 via the subtitle 704, or transmit the non-programming related content and/or URL address associated with the trigger to the remote device 204 via the links 706 or 708.

Alternatively or in addition, if there is activity on the override channel 802, hardware and software in the headend 104 can obtain the triggers from that channel, and make the triggers available to the remote device 204 via a communication path independent of the STB 102. For instance, the triggers can be made available to the remote device 204 via the link 722 and the Internet 108.

Still alternatively or in addition, the multiplexer 602 can be configured such that the only signal at its output is the signal from the override channel 802, if activity is detected on the override channel 802 at the headend 104. The television signals on the other channels may be suppressed by the multiplexer 602 and/or replaced by the signal from the override channel 802, if activity (e.g., triggers) is detected in the override channel 802. Thus in this embodiment, the only television signal that STBs 102 can receive from the headend 104 is the signal from the override channel 802, thereby providing an effective technique to convey information regardless of which channel the STB 102 is currently tuned to.

Figure 8B:
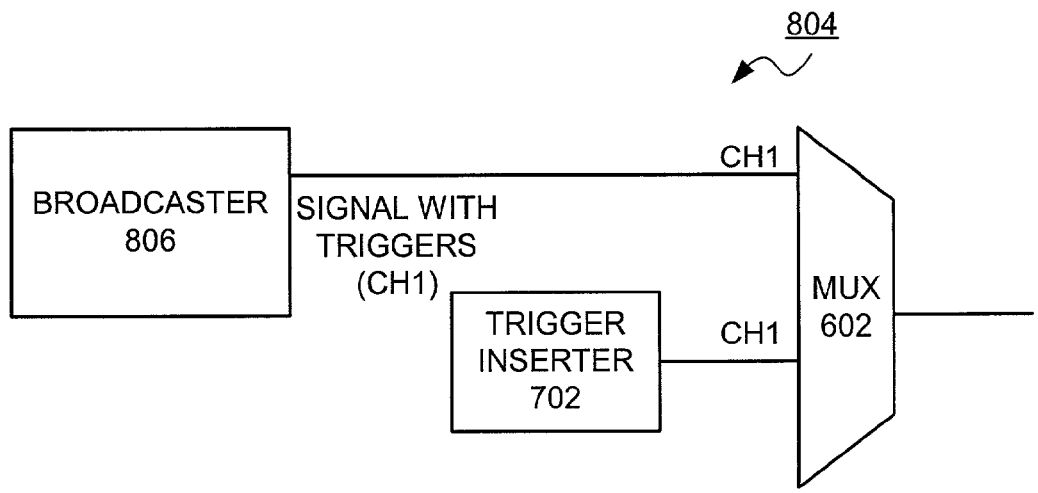
Figure 8C:
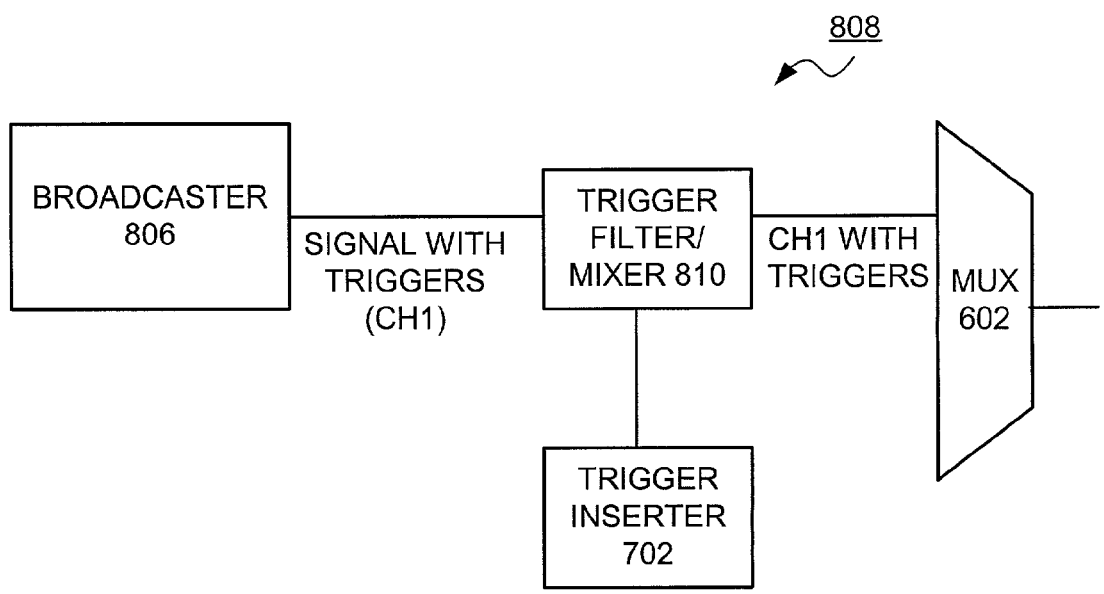

FIGS. 8B and 8C show embodiments of systems 804 and 808, respectively, that may be used for merging MSO triggers (e.g., non-programming related triggers) with broadcaster triggers. Components of the systems 804 and 808 may be embodied at least in part by the systems 500-800 or the system 100. In FIG. 8B, a signal with programming-related triggers is provided by a broadcaster 806 on a particular television broadcast channel (e.g., CH1). The trigger inserter 702 may insert non-programming related triggers into the signal prior to multiplexing by the multiplexer 602, such as at the headend 104.

In FIG. 8C, a trigger filter/mixer 810 is coupled to receive the television signal having triggers from the broadcaster 806. The trigger filter/mixer 810 is also coupled to the trigger inserter 702. In an embodiment, the trigger filter/mixer 810 contains logic to decide how the triggers from the original broadcaster 806 and the trigger inserter 702 are filtered and/or combined, prior to providing the signal having the inserted triggers to the multiplexer 602.

Figure 9:
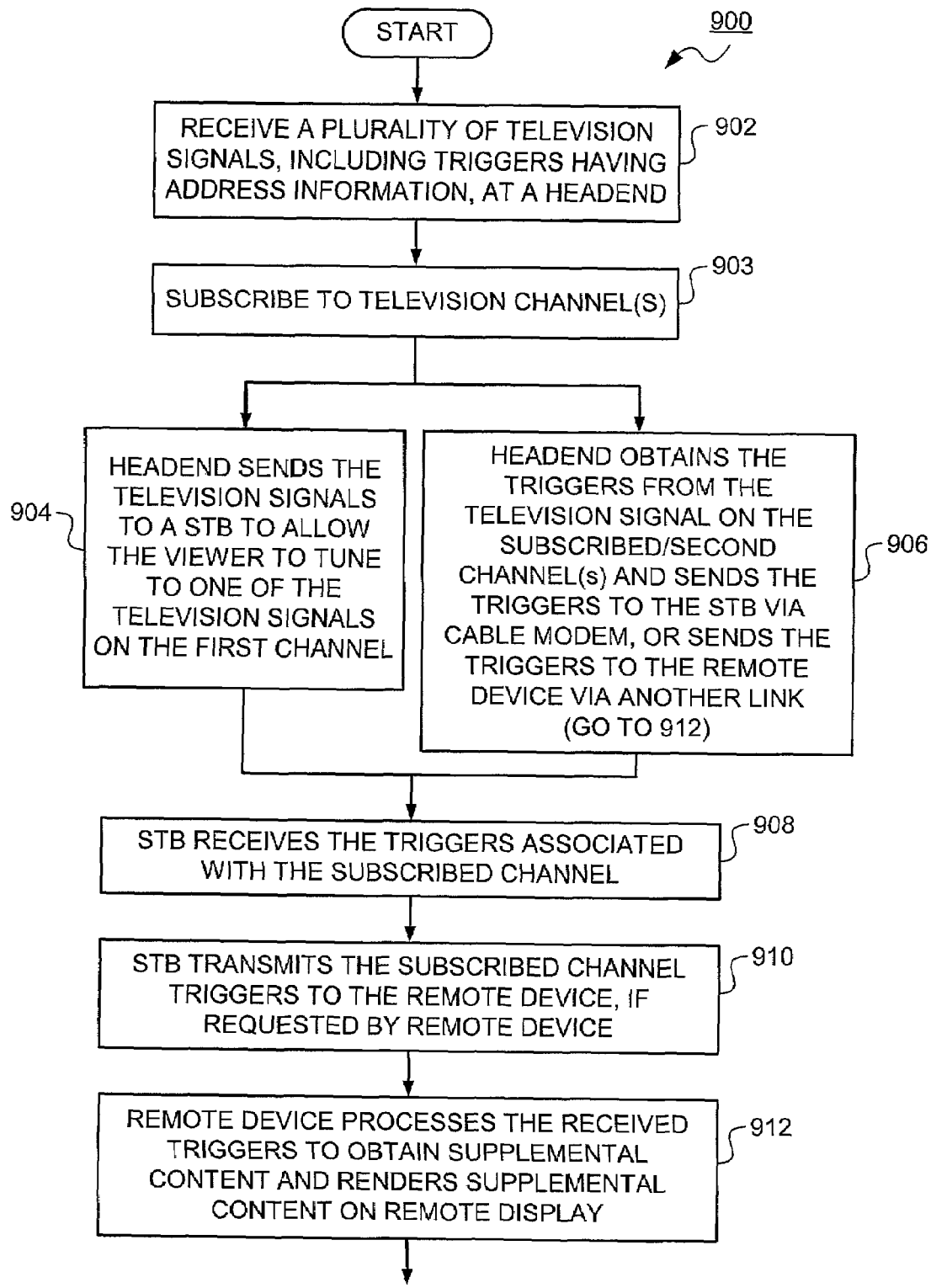
FIGS. 9 and 10 are flowcharts of a method for providing programming-related and non-programming-related URL addresses according to an embodiment of the invention.
Figure 10:
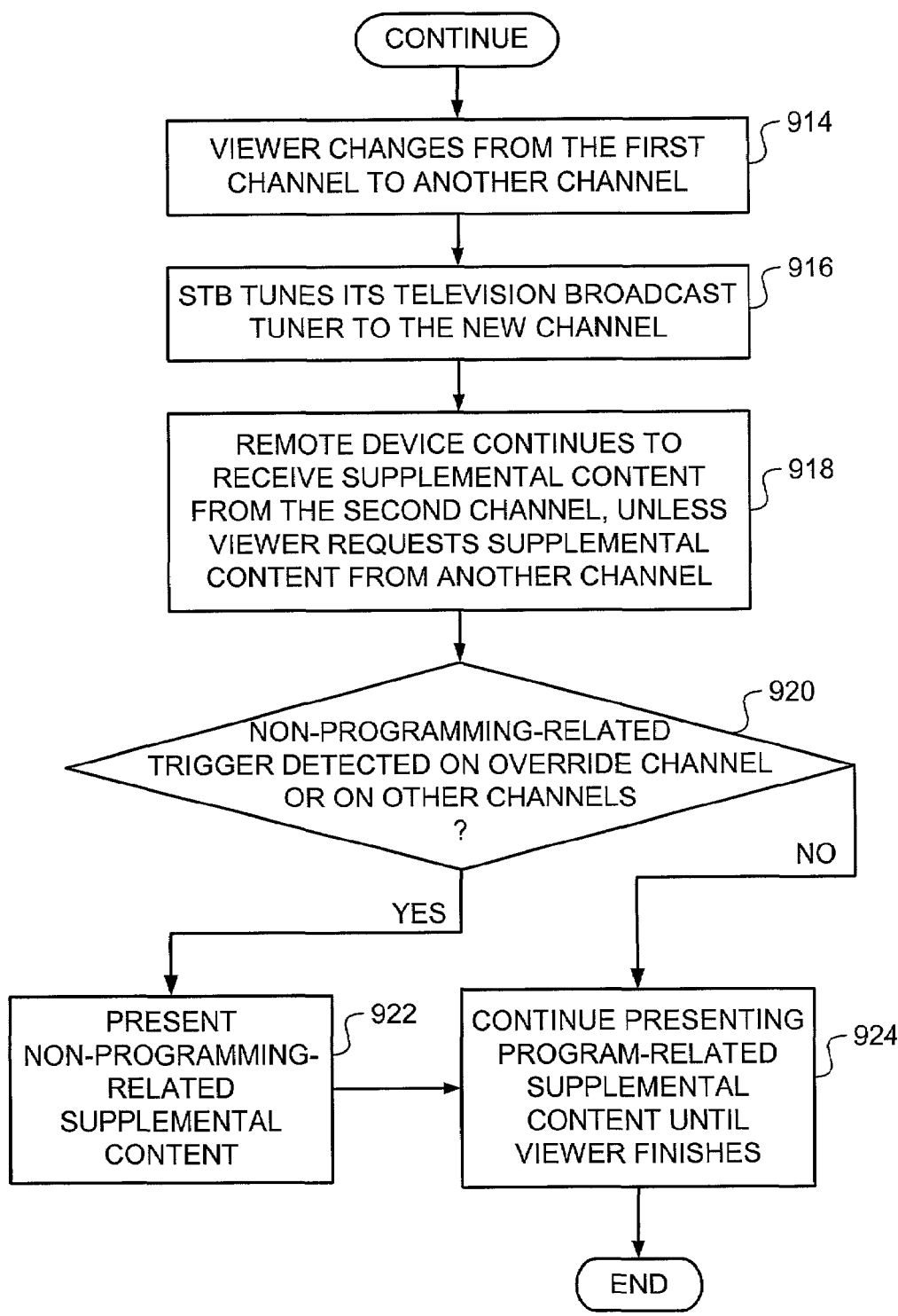

Referring now to FIGS. 9 and 10, there is shown a flowchart of one possible embodiment of a method 900 for providing programming-related and non-programming-related URL addresses according to an embodiment of the invention. At least some of the elements of the method 900 can be embodied in software or other machine-readable instructions stored on a machine-readable medium at the STB 102 (such as the digital storage device 304), at the remote device 204, at the interactive video casting system 100, or a suitable combination thereof. The method 900 begins at a block 902, in one embodiment, when television signals accompanied by triggers having address information (such as program-related URL addresses) are received at the headend 104.

At a block 903, channels are subscribed such that triggers on these channels can be extracted, processed, and stored for subsequent use by the viewer to access supplemental content from the subscribed channel(s). Techniques to subscribe channels are described above. The subscription may be performed at one or more suitable times, and need not necessarily occur where shown in the illustrated flowchart.

In one embodiment at a block 904, the headend 104 sends the television signals (which may be accompanied by triggers) to the STB 102 to allow the viewer to tune to any one of the television signals on a first channel. The television broadcast tuner of the STB 102 may be used for this purpose. If triggers are present with the television signal on this first channel, the viewer has the option to respond to or ignore such triggers.

Simultaneously at a block 906, the headend 104 obtains the triggers from the television signal on the subscribed/second channel(s), and sends these triggers to the STB 102 via a cable modem connection, such as via a DOCSIS or DAVIC channel, if these triggers are requested by the viewer. Alternatively or in addition at the block 906, the headend 104 may send the triggers to the remote device 204 via another link independent of the cable modem connection, such as via a server and the Internet 108, as depicted in FIGS. 5-6. If sent via this link, then the method 900 proceeds to a block 912.

At a block 908, the STB 102 may receive triggers along with a television signal, such as triggers embedded with the television signal (e.g., from the block 904), and/or via the cable modem (e.g., from the block 906 for subscribed channels). The STB 102 then transmits at a block 910 the triggers from the subscribed channel to the remote device 204 using a wireless method, as described above, if the remote device 204 requests the triggers. It is to be appreciated that at the block 910, the STB 102 may transmit triggers from the currently tuned to channel (e.g., the first channel depicted in the block 904) to the remote device 204, alternatively or in addition to the triggers from the subscribed channel.

At the block 912, the remote device 204 receives and processes the received triggers to obtain program-related supplemental content associated with the second channel. The remote device 204 renders or begins displaying the supplemental content on the remote display 220.

FIG. 10 is a continuation of FIG. 9. In one embodiment, the viewer may change/tune the current channel from the first channel to another channel, such as when channel surfing, at a block 914. The STB 102 tunes its television broadcast tuner from the first channel to the new channel at a block 916, while the remote device 204 is still receiving the supplemental content associated with the subscribed channel at a block 918. In one embodiment, the STB 102 may prompt the viewer at the block 918 via the television screen: "Do you wish to continue receiving triggers from the subscribed channel?" If the viewer responds negatively, then the viewer may choose to receive triggers from other channels. Otherwise, the viewer may continue to receive supplemental content associated with the subscribed channel.

At any time during the method 900 of FIGS. 9-10, non-programming-related triggers may be sent from the headend 104. If such triggers are not detected (e.g., they are not present) at a block 920, then the viewer may continue to view programming-related supplemental content at a block 924. If such triggers are detected on the override channel 802 and/or overloaded on other channels at the block 920, then the corresponding supplemental content can be presented at a block 922 on the television 202 or on the remote device 204, as depicted in FIGS. 7 and -8A-8C. After expiration of the non-programming-related supplemental content, the viewer can return to continue viewing programming-related supplemental content at the block 924.

In conclusion, supplemental content related to a television program can be provided from an interactive television system to the remote device 204, at least alternatively to what the viewer is watching on the television 202. The STB 102 can obtain URL addresses associated with programming-related and/or non-programming-related supplemental content from triggers that are sent in addition to an audio-visual television signal. The STB 102 transmits the URL addresses to the remote device 204, while the remote device 204 can also receive URL addresses from the Internet 108.

he above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while the remote device 204 may be embodied as a device about the size of a notebook, it is to be appreciated that other types of remote devices may be implemented in other embodiments. For example, a laptop, PC, or wireless handheld device capable of communicating with the STB 102 can be used in other embodiments. Other types of suitable devices, which are not necessarily PC-grade devices with a full operating system, can be used as the remote device 204 if they can render Internet-hosted content or other supplemental content. In an embodiment, even the STB 102 can be used to perform at least some of the operations described above, including obtaining the supplemental content and transmitting the supplemental content to the remote device 204 along with or instead of the URL addresses.

As another modification, a satellite television (TV) delivery system may be implemented alternatively or in addition to a cable distribution system. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center (e.g., analogous to the head-end 106) may be used to gather programming content, ensure its digital quality, and transmit the signal up to the satellites. Programming may come to the broadcast center from content providers (TBS™, HBO™, CNN™, ESPN™, etc.) via satellite, fiber optic cable, and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling system, and playback may be triggered by a computerized signal sent from a broadcast automation system. Back-up videotape playback equipment may ensure uninterrupted transmission at all times.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An interactive video casting system, comprising:
a headend having a multiplexer to multiplex a plurality of input television signals for a corresponding plurality of television channels, wherein at least some of the television signals are accompanied by supplemental content including trigger information associated with programming on respective television channels;
a trigger processor coupled to the multiplexer to obtain the trigger information from at least some of the television channels;

a remote control device configured and arranged for providing user input to the system, the remote control device comprising a storage unit on the remote control device; and a storage unit coupled to the headend to store the trigger information obtained by the trigger processor from the television channels, wherein the interactive video casting system is configured and arranged to allow the user to individually identify as a user preference one or more television channels, from the plurality of television channels, for which trigger information will be provided to the remote control device for storage in the storage unit on the remote control device for later retrieval from the storage unit on the remote control device.

2. The system of claim 1 wherein the trigger processor is coupled to obtain the trigger information from all of the television channels, the system further comprising a server coupled to the trigger processor to provide the obtained trigger information from all of the television channels to the remote control device.

3. The system of claim 1 wherein the trigger processor is coupled to provide the obtained trigger information to a client terminal, the client terminal being capable to tune to a first channel to receive a television signal therein and to tune to a second channel to receive the obtained trigger information unrelated to the television signal received via the first channel, the client terminal further being capable to send the received obtained trigger information to the remote control device.

4. The system of claim 3 wherein the trigger processor is coupled to provide the obtained trigger information to the remote control device by way of a communication link independent of the client terminal.

5. The system of claim 3 wherein the trigger processor is coupled to provide the obtained trigger information to the client terminal by way of a cable modem connection.

6. The system of the claim 1 wherein the headend is coupled to receive an instruction from the remote control device to obtain and store trigger information from a television program in a particular television channel that is tuned to prior to tuning to another television channel.

7. The system of claim 6 wherein the instruction instructs the headend to obtain and store trigger information from television programs based on viewer preferences.

8. The system of claim 1 wherein the headend is coupled to receive an instruction from the remote control device to obtain and store, in the storage unit on the remote control device, trigger information associated with a particular television channel while a client terminal located proximate to the remote control device is tuned to a television signal on a different television channel.

9. The system of claim 1 wherein the storage unit on the remote control device is capable to store a viewer preference related to determination of which triggers to obtain.

10. The system of claim 1, further comprising a trigger inserter coupled to the multiplexer to overload at least some of the television channels with non-programming-related trigger information that is to be provided to at least one of a client terminal coupled to a television and the remote control device.

11. The system of claim 1 wherein the multiplexer includes an override channel as an input, the override channel capable to carry non-programming-related trigger information that is to be provided to at least one of a client terminal coupled to a television and the remote control device in at least some of the television channels.

12. An interactive video casting system, comprising:

a broadcast center having a multiplexer to multiplex a plurality of input television signals for a corresponding plurality of television channels, wherein at least some of the television signals are accompanied by supplemental content including trigger information associated with programming on respective television channels;

a trigger processor coupled to the multiplexer to obtain the trigger information from at least some of the television channels;

a remote control device configured and arranged for providing user input to the system, the remote control device comprising a storage unit on the remote control device; and a storage unit coupled to the headend to store the trigger information obtained by the trigger processor from the television channels, wherein the interactive video casting system is configured and arranged to allow the user to individually identify as a user preference one or more television channels, from the plurality of television channels, for which trigger information will be provided to the remote control device for storage in the storage unit on the remote control device for later retrieval from the storage unit on the remote control device, wherein a client terminal for a television for the interactive video casting system is coupled to present supplemental content corresponding to trigger information on the television, wherein the television includes a screen to display supplemental content available from the interactive video casting system, wherein the client terminal is capable of being communicatively coupled to the interactive video casting system to receive the trigger information from the interactive video casting system and is coupled to present at least some of the supplemental content on the screen of the television in addition to television signals from television channels, wherein the interactive video casting system includes a plurality of content sources communicatively coupled to a plurality of broadcast centers, wherein the broadcast centers are coupled to storage mediums to store at least some of the supplemental content to be made available to the client terminal, and wherein the interactive video casting system is capable to provide the trigger information to the remote control device via different communication channels, including at least one of a plurality of television broadcast channels and a communication channel with a communication network.

13. The system of claim 12 wherein the broadcast center comprises part of a satellite delivery system.

14. The system of claim 12 wherein the interactive video casting system comprises an interactive television system.

15. An interactive video casting system, comprising:

a broadcast center having a multiplexer to multiplex a plurality of input television signals for corresponding plurality of television channels, wherein at least some of the television signals are accompanied by supplemental content including trigger information associated with programming on respective television channels;

a trigger processor coupled to the multiplexer to obtain the trigger information from at least some of the television channels;

a remote control device configured and arranged for providing user input to the system, the remote control device comprising a storage unit on the remote control device; and a storage unit coupled to the headend to store the trigger information obtained by the trigger processor from the television channels, wherein the interactive video casting system is configured and arranged to allow the user to individually identify as a user preference one or more television channels, from the plurality of television channels, for which trigger information will be provided to the remote control device for storage in the storage unit on the remote control device for later retrieval from the storage unit on the remote control device, wherein a client terminal for a television for the interactive video casting system is coupled to present supplemental content corresponding to trigger information on the television, wherein the television includes a screen to display supplemental content available from the interactive video casting system, wherein the client terminal is capable of being communicatively coupled to the interactive video casting system to receive the trigger information from the interactive video casting system and is coupled to present at least some of the supplemental content on the screen of the television in addition to television signals from television channels, wherein the interactive video casting system includes a plurality of content sources communicatively coupled to a plurality of broadcast centers, wherein the broadcast centers are coupled to storage mediums to store at least some of the supplemental content to be made available to the client terminal, and wherein the interactive video casting system is capable to provide the trigger information to the remote control device via different communication paths, including at least one of a plurality of television broadcast channels and a communication path with a communication network; and a trigger inserter coupled to the multiplexer to insert non-programming-related trigger information in at least one of the television channels.

16. The system of claim 15 wherein the trigger inserter is coupled to the multiplexer to overload a plurality of the television channels with non-programming-related trigger information that is to be provided to at least one of a client terminal coupled to a television and the remote control device.

17. The system of claim 15 wherein the multiplexer includes an override channel at an input terminal coupled to the trigger inserter, the override channel being capable to carry non-programming-related trigger information that is to be provided, in a plurality of the television channels, to at least one of a client terminal coupled to a television and the remote control device.

18. The system of claim 15, further comprising a trigger mixer coupled to receive a television signal and coupled to the trigger inserter to receive non-programming-related trigger information from the trigger inserter, the trigger mixer capable to mix the non-programming-related trigger information into the received television signal.

19. The system of claim 15 wherein one of the paths to provide the address information to the remote control device via different communication paths includes a path that uses a cable modem in a client terminal to receive the non-programming-related trigger information from the interactive video casting system.

20. An interactive video casting system, comprising:

a headend having a multiplexer to multiplex a plurality of input television signals for a corresponding plurality of television channels, wherein at least some of the television signals are accompanied by supplemental content including trigger information associated with Programming on respective television channels;

a trigger processor coupled to the multiplexer to obtain the trigger information from at least some of the television channels;

a remote control device configured and arranged for providing user input to the system, the remote control device comprising a storage unit on the remote control device; and a storage unit coupled to the headend to store the trigger information obtained by the trigger processor from the television channels, wherein the interactive video casting system is configured and arranged to allow the user to individually identify as a user preference one or more television programs, from the plurality of television channels, for which trigger information will be provided to the remote control device for storage in the storage unit on the remote control device for later retrieval from the storage unit on the remote control device.

21. The system of claim 20 wherein the trigger processor is coupled to provide the obtained trigger information to a client terminal, the client terminal being capable to tune to a first channel to receive a television signal therein and to tune to a second channel to receive the obtained trigger information unrelated to the television signal received via the first channel, the client terminal further being capable to send the received obtained trigger information to the remote control device.

22. The system of claim 21 wherein the trigger processor is coupled to provide the obtained trigger information to the remote control device by way of a communication link independent of the client terminal.

23. The system of claim 21 wherein the trigger processor is coupled to provide the obtained trigger information to the client terminal by way of a cable modem connection.

24. The system of the claim 21 wherein the headend is coupled to receive an instruction from the remote control device to obtain and store trigger information from a television program in a particular television channel that is tuned to prior to tuning to another television channel.

25. The system of claim 24 wherein the instruction instructs the headend to obtain and store trigger information from television programs based on viewer preferences.

26. The system of claim 21 wherein the storage unit is capable to store a viewer preference related to determination of which triggers to obtain.

27. The system of claim 21, further comprising a trigger inserter coupled to the multiplexer to overload at least some of the television channels with non-programming-related trigger information that is to be provided to at least one of a client terminal coupled to a television and the remote control device.

28. The system of claim 21 wherein the multiplexer includes an override channel as an input, the override channel capable to carry non-programming-related trigger information that is to be provided to at least one of a client terminal coupled to a television and the remote control device in at least some of the television channels.

29. An interactive video casting system, comprising:

a broadcast center having a multiplexer to multiplex a plurality of input television signals for a corresponding plurality of television channels, wherein at least some of the television signals are accompanied by supplemental content including trigger information associated with programming on respective television channels;

a trigger processor coupled to the multiplexer to obtain the trigger information from at least some of the television channels;

a remote control device configured and arranged for providing user input to the system, the remote control device comprising a storage unit on the remote control device; and a storage unit coupled to the headend to store the trigger information obtained by the trigger processor from the television channels, wherein the interactive video casting system is configured and arranged to allow the user to individually identify as a user preference one or more television programs, from the plurality of television channels, for which trigger information will be provided to the remote control device for storage in the storage unit on the remote control device for later retrieval from the storage unit on the remote control device, wherein a client terminal for a television for the interactive video casting system is coupled to present supplemental content corresponding to trigger information on the television, wherein the television includes a screen to display supplemental content available from the interactive video casting system, wherein the client terminal is capable of being communicatively coupled to the interactive video casting system to receive the trigger information from the interactive video casting system and is coupled to present at least some of the supplemental content on the screen of the television in addition to television signals from television channels, wherein the interactive video casting system includes a plurality of content sources communicatively coupled to a plurality of broadcast centers, wherein the broadcast centers are coupled to storage mediums to store at least some of the supplemental content to be made available to the client terminal, and wherein the interactive video casting system is capable to provide the trigger information to the remote control device via different communication channels, including at least one of a plurality of television broadcast channels and a communication channel with a communication network.

30. The system of claim 29 wherein the broadcast center comprises part of a satellite delivery system.

31. The system of claim 29 wherein the interactive video casting system comprises an interactive television system.

32. An interactive video casting system, comprising:

a broadcast center having a multiplexer to multiplex a plurality of input television signals for corresponding plurality of television channels, wherein at least some of the television signals are accompanied by supplemental content including trigger information associated with programming on respective television channels;

a trigger processor coupled to the multiplexer to obtain the trigger information from at least some of the television channels;

a remote control device configured and arranged for providing user input to the system, the remote control device comprising a storage unit on the remote control device; and a storage unit coupled to the headend to store the trigger information obtained by the trigger processor from the television channels, wherein the interactive video casting system is configured and arranged to allow the user to individually identify as a user preference one or more television programs, from the plurality of television channels, for which trigger information will be provided to the remote control device for storage in the storage unit on the remote control device for later retrieval from the storage unit on the remote control device, wherein a client terminal for a television for the interactive video casting system is coupled to present supplemental content corresponding to trigger information on the television, wherein the television includes a screen to display supplemental content available from the interactive video casting system, wherein the client terminal is capable of being communicatively coupled to the interactive video casting system to receive the trigger information from the interactive video casting system and is coupled to present at least some of the supplemental content on the screen of the television in addition to television signals from television channels, wherein the interactive video casting system includes a plurality of content sources communicatively coupled to a plurality of broadcast centers, wherein the broadcast centers are coupled to storage mediums to store at least some of the supplemental content to be made available to the client terminal, and wherein the interactive video casting system is capable to provide the trigger information to the remote control device via different communication paths, including at least one of a plurality of television broadcast channels and a communication path with a communication network; and a trigger inserter coupled to the multiplexer to insert non-programming-related trigger information in at least one of the television channels.

33. The system of claim 32 wherein the trigger inserter is coupled to the multiplexer to overload a plurality of the television channels with non-programming-related trigger information that is to be provided to at least one of a client terminal coupled to a television and the remote control device.

34. The system of claim 32 wherein the multiplexer includes an override channel at an input terminal coupled to the trigger inserter, the override channel being capable to carry non-programming-related trigger information that is to be provided, in a plurality of the television channels, to at least one of a client terminal coupled to a television and the remote control device.

35. The system of claim 32, further comprising a trigger mixer coupled to receive a television signal and coupled to the trigger inserter to receive non-programming-related trigger information from the trigger inserter, the trigger mixer capable to mix the non-programming-related trigger information into the received television signal.

36. The system of claim 32 wherein one of the paths to provide the address information to the remote control device via different communication paths includes a path that uses a cable modem in a client terminal to receive the non-programming-related trigger information from the interactive video casting system.

* * * * *